US009141441B2

(12) United States Patent
Fletcher et al.

(10) Patent No.: US 9,141,441 B2
(45) Date of Patent: *Sep. 22, 2015

(54) MANAGING COMPUTING RESOURCES THROUGH AGGREGATED CORE MANAGEMENT

(71) Applicant: International Business Machines Corporation, Armonk, NY (US)

(72) Inventors: James C. Fletcher, Apex, NC (US); Balachandar Rajaraman, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 261 days.

This patent is subject to a terminal disclaimer.

(21) Appl. No.: 13/777,478

(22) Filed: Feb. 26, 2013

(65) Prior Publication Data

US 2014/0007134 A1   Jan. 2, 2014

Related U.S. Application Data

(63) Continuation of application No. 13/538,830, filed on Jun. 29, 2012, now Pat. No. 8,904,204.

(51) Int. Cl.
  *G06F 1/32* (2006.01)
  *G06F 9/54* (2006.01)
  *G06F 9/50* (2006.01)

(52) U.S. Cl.
  CPC ............... *G06F 9/54* (2013.01); *G06F 9/5094* (2013.01); *Y02B 60/142* (2013.01)

(58) Field of Classification Search
  USPC ......................................... 713/300, 320, 323
  See application file for complete search history.

(56) References Cited

U.S. PATENT DOCUMENTS

| 7,702,779 | B1* | 4/2010 | Gupta et al. ................... 709/224 |
| 2009/0190590 | A1* | 7/2009 | Agetsuma et al. ............ 370/392 |
| 2010/0049963 | A1 | 2/2010 | Bell, Jr. et al. |
| 2011/0119670 | A1 | 5/2011 | Sugumar et al. |
| 2011/0167286 | A1 | 7/2011 | Varadarajan |
| 2011/0209153 | A1* | 8/2011 | Suzuki et al. ................. 718/102 |
| 2011/0307730 | A1 | 12/2011 | Marshall et al. |
| 2012/0054511 | A1 | 3/2012 | Brinks et al. |
| 2012/0151061 | A1* | 6/2012 | Bartfai-Walcott et al. ... 709/226 |
| 2012/0185462 | A1 | 7/2012 | Albrecht et al. |
| 2013/0013911 | A1 | 1/2013 | Gustafsson |
| 2013/0318379 | A1 | 11/2013 | Seshadri et al. |
| 2014/0115596 | A1 | 4/2014 | Khan et al. |
| 2013/0312001 | A1 | 11/2014 | Suzuki |

OTHER PUBLICATIONS

"U.S. Appl. No. 13/538,830 Office Action", May 7, 2014, 10 pages.

* cited by examiner

*Primary Examiner* — Vincent Tran
(74) *Attorney, Agent, or Firm* — DeLizio Law, PLLC

(57) ABSTRACT

Systems, methods and computer program products manage computing resources for a system. A system includes a set of processors having multiple processor cores present in the computer system, where the processor cores form an aggregated set of processor cores for the system. A dependency analyzer determines dependencies among a set of workload components executing on the set of processor cores. A policy includes rules associated with managing one or more of power consumption, heat production, operating cost or workload balancing for the set of aggregated processor cores. In response to a workload event, a management component sets a state of one or more of the processor cores in accordance with the workload event, the policy and the set of dependencies.

7 Claims, 4 Drawing Sheets

MANAGING COMPUTING RESOURCES THROUGH AGGREGATED CORE MANAGEMENT

RELATED APPLICATIONS

This application claims the priority benefit of U.S. application Ser. No. 13/538,830 filed Jun. 29, 2012.

BACKGROUND

Embodiments of the inventive subject matter generally relate to the field of computer systems, and, more particularly, to managing operating characteristics of computer systems through aggregated core management.

One way to increase the computing power of microprocessors is to increase the number of processor cores in the processor. As microprocessors become more powerful, virtual environments executing on such multi-core processors have grown in size and complexity as they include larger and larger numbers of processors and processor cores. As a result, typical system environments include a large number of processors, generally running at full capacity without any regard to overall energy efficiency, heat production, or workload management across the complex of systems. These computer systems are often operating independently with no overall regard for the broader system.

SUMMARY

Systems, methods and computer program products manage computing resources for a system. A system includes a set of processors having multiple processor cores present in the computer system, where the processor cores form an aggregated set of processor cores for the system. A dependency analyzer determines dependencies among a set of workload components executing on the set of processor cores. A policy includes rules associated with managing one or more of power consumption, heat production, operating cost or workload balancing for the set of aggregated processor cores. In response to a workload event, a management component sets a state of one or more of the processor cores in accordance with the workload event, the policy and the set of dependencies.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

As processors move to greater and greater numbers of embedded processor cores, and as virtual environments grow to larger numbers of machines containing these multi-processor cores, the ability to manage the individual cores in aggregate across a broader collection of systems can provide a significant level of improvement in energy consumption within a data center, cloud computing environment or other collection of computer systems. The processor cores consume energy and produce heat so any reduction in core usage can have a multi-fold impact. The inventive subject matter includes embodiments that manage the overall collection of cores as an aggregate across all of the processors involved within a multiple computer environment such as a cloud computing environment and enable/disable cores or reduce clock speeds to improve operating efficiency based on current computing needs and policies to provide an efficient overall environment.

Figure 1:
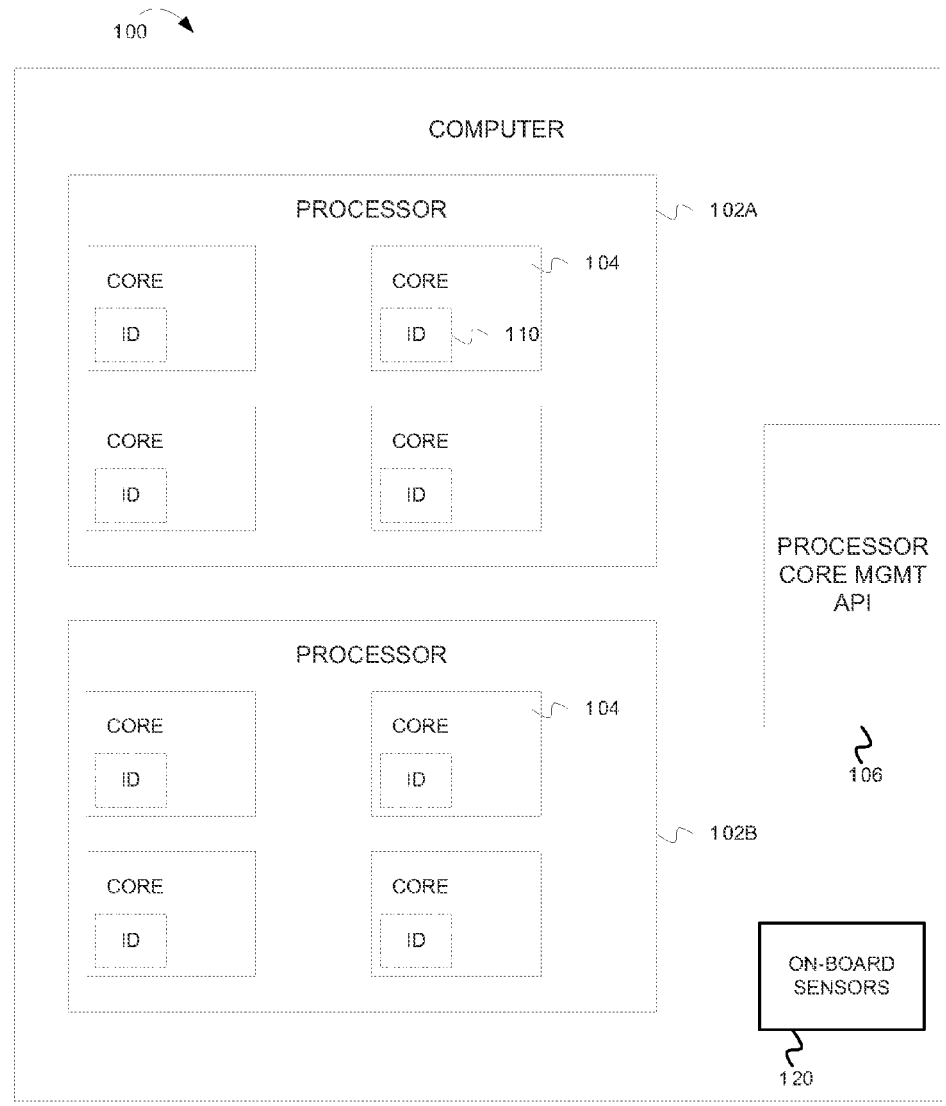
FIG. 1 illustrates an example multiprocessor/multicore computer that may be included as part of a larger multiple system computing environment.

FIG. 1 illustrates an example multi-processor computer 100 that may be included as part of a larger multiple system computing environment. For example, computer 100 may be an individual blade of a multiple blade computer system that is intended for use as part of a rack of computer systems. Alternatively, computer 100 may be a standalone client or server computer that is part of a multiple computer system. Computer 100 includes processors 102 and a processor core management API (Application Programming Interface) 106. Computer 100 will typically include other components such as memory, hard drives, network interfaces etc. that are not shown in order to avoid obfuscating the inventive subject matter. Although two processors are illustrated in FIG. 1, those of skill in the art will appreciate that a system may include a single processor or may include more processors.

Processors 102 include multiple processor cores 104. In the example illustrated in FIG. 1, a processor 102 includes four processor cores. Those of skill in the art will appreciate that a processor may contain fewer or more processor cores. Further, it should be noted that the number of cores in a processor may vary from one processor to another on computer 100. The cores in a processor may be assigned an identifier 110 in order to identify a core and distinguish it from other cores in a processor. The mechanism used to identify a core in a processor will typically depend on manufacturer of the processor.

Processor core management API 106 provides functions that control operating characteristics of cores 104. For example, processor core management API 106 may provide functions that turn cores on and off, provide the current state of a core (on/off state, utilization, clock speed, power usage, etc.) or set a maximum processing speed or clock speed for a processor core. Processor core management API 106 may be implemented at various levels within computer 100. For example, processor core management API 106 may be implemented in whole or in part as hardware logic or firmware on computer 100. Additionally, some or ail of processor core management API 106 may be implemented as software, for example, software that is provided as part of an operating system executing on computer 100.

Computer 100 may include one or more on-board sensors 120. On-board sensors may provide data regarding temperature and power consumption of various components of computer 100 such as processors, processor cores, hard drives, memory, graphics cards etc. These sensors might also be provided by an external source to provide the same or similar data.

Figure 2:
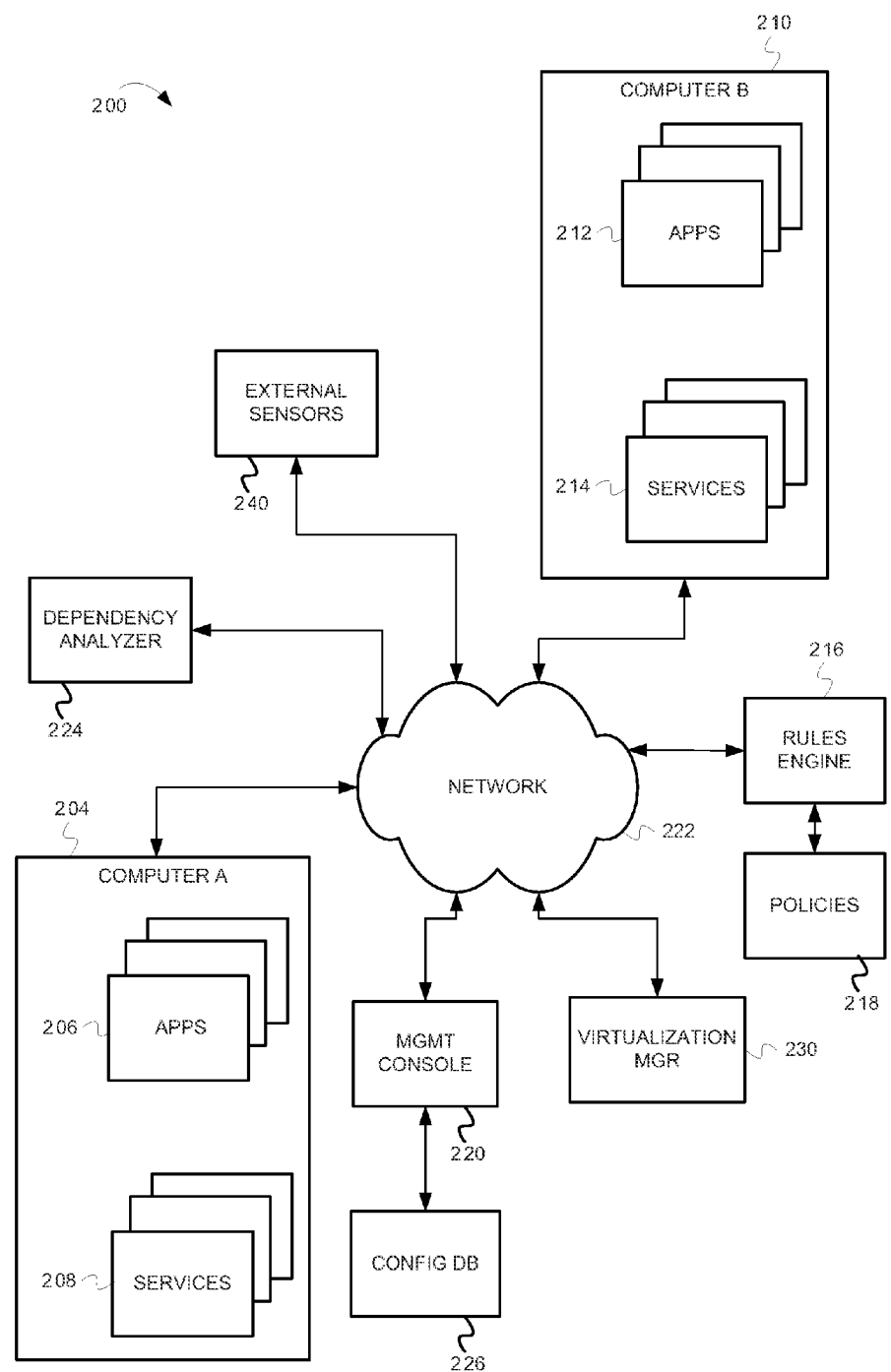
FIG. 2 illustrates an example multiple computer system that incorporates embodiments of the inventive subject matter.

FIG. 2 illustrates an example multiple computer system 200 that incorporates embodiments of the inventive subject matter. System 200 may include one or more of computers 204 and 210, a management console 220, a dependency analyzer 224, a rules engine 216, a virtualization manager 230 and external sensors 240 where one or more of the components of the system is communicably coupled via network 222. Network 222 may be a wireless or wired network and may be a private network such as an intranet or a public network such as the Internet.

Computers 204 and 210 may be computer systems such as computer 100 of FIG. 1. Two computers are illustrated in example computer system 200 to aid in illustrating the embodiments. However, it should be noted that system 100 will typically have more than two computers, and in fact may include tens, hundreds or even thousands of computers. As an example, system 100 may be part of a data center or cloud computing environment.

Computers such as computers 204 and 210 may execute applications 206 and 212, services 208 and 214 or both applications and services. Applications and services may be referred to collectively as workload components of system 200. Workload components may also include processes, threads or constituent components of an application or service. Applications 206 and 212 may provide distinct functions from one another or they may be redundant copies for use in workload balancing or failover management. Similarly, services 208 and 214 may provide distinct services from one another or may be redundant copies for use in workload balancing or failover management. The embodiments are not limited to any particular combination of applications and services.

Dependency analyzer 224 analyzes the applications and services running or configured to run within system 200 and determines if there are dependencies between applications and services, services and other services, or applications and other applications. For example, an application may make use of a database that is maintained by a database service. In this case, there is a dependency between the application and the database service. Other types of dependencies may exist and are within the scope of the inventive subject matter.

Management console 220 may optionally be present on system 200, and provides administration, operation and maintenance functions for system 100. Management console 106 may be used to configure die hardware, software and virtual machines on system 100. Management console 220 may maintain a configuration database 226 to store configuration and operational data regarding system 200. The configuration data may include both hardware and software configuration details. For example, configuration database 226 may store data describing the computers within system 200. Such data may include data associated with the processors and processor cores that are part of the computer, the processing speed of the processor cores, memory associated with the processor cores, power requirements or power usage characteristics of the processor cores etc. Configuration data 226 may also include the physical location and identification of power circuits supplying power to the various computers of system 200. Further, configuration data 226 may include a list of the software applications and services provided on system 200. Configuration database 226 may further include data regarding virtual machines that are configured to execute within system 200. Examples of management consoles include the HMC (Hardware Management Console), SDMC (System Director Management Console) and IVM (Integrated Virtualization Manager) management consoles provided by IBM Corporation.

Virtualization manager 230 manages a virtualized operating environment and provides virtualized resources (e.g., virtualized hardware resources) for system 200. Virtualization manager 230 manages virtual machines (also referred to as partitions) executing on various computers of system 200. A virtual machine runs an operating system and applications within the virtual machine. The operating system and applications running on one virtual machine may be completely different from the operating system and applications running on other virtual machines. For example, one virtual machine may be running an accounting system on the AIX operating system while another virtual machine may run file server applications on a Linux operating system. Alternatively, a virtual machine may run the same operating system and applications as another virtual machine and serve as a backup in case of a failure or overload in the other virtual machine. From the point of view of a virtual machine, the virtual machine appears to be an independent computer that controls the underlying hardware when in reality, each virtual machine is sharing hardware resource with other virtual machines. Virtualization manager 230 may also be referred to as a hypervisor.

Rules engine 216 analyzes and applies a set of policies 218 that may be maintained in a policy database. Policies 218 may define rules for handling various conditions or events that may occur within system 200. For example, there may be policies designed to manage power consumption, heat distribution, workload balancing or other aspects regarding the operation of the computers in system 200.

System 200 may include one or more external sensors 240. External sensors 240 may provide data regarding power usage, heat production, or other environment factors regarding the operation of system 200 or some portion of system 200. For example, external sensors 240 may include heat sensors that are placed on racks within a data center or within air returns of the air conditioning system of a data center. Power sensors may measure power consumption of computers on circuits monitored by the power sensor. Data from external sensors 240 may be used along with data from on-board sensors 120 (FIG. 1) as input parameters for rules in policies 218.

Operation of the above components of system 200 will be further described below with reference to the flowchart of FIG. 3.

Figure 3:
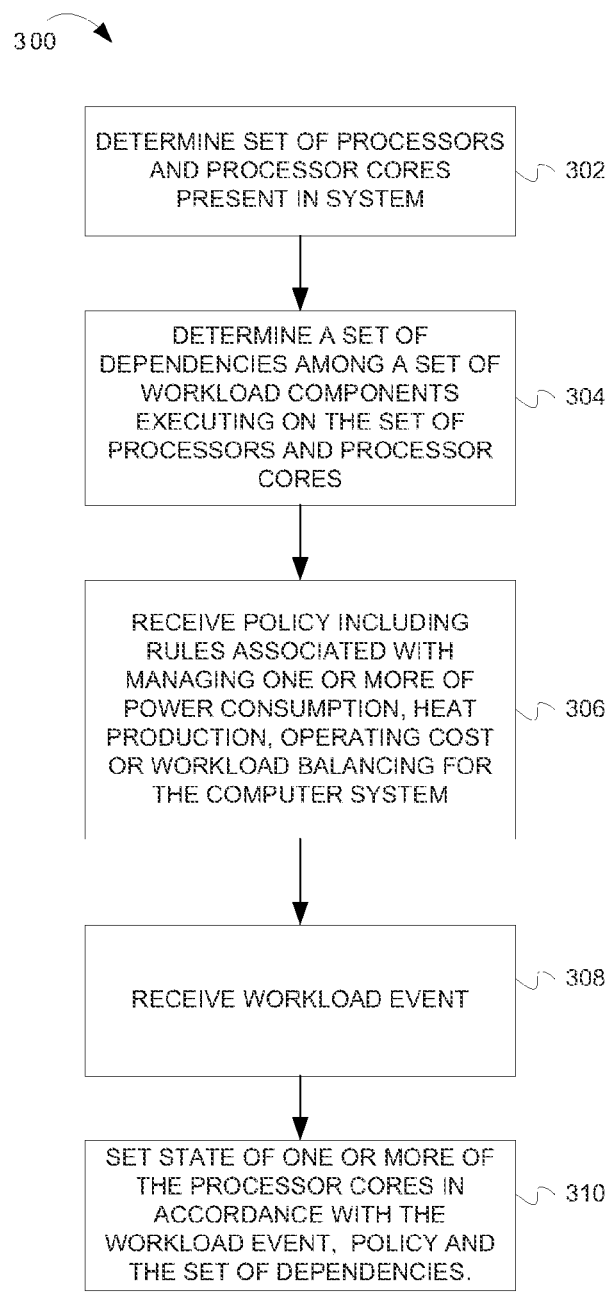
FIG. 3 is a flowchart illustrating a method for managing processor core resources according to embodiments of the inventive subject matter.

FIG. 3 is a flowchart illustrating a method for managing processor core resources according to embodiments of the inventive subject matter. The method begins at block 302 by determining a set of processors and processor cores in a system. In some embodiments, the determination may be made by querying a configuration database 226. In alternative embodiments, a management console 220 or other component may issue queries to determine the computers, processors and processor cores present in a system.

At block 304, a system component such as a management console 220 determines a set of dependencies between a set of workload components executing on the processors and processor cores. In some embodiments, determining the set of dependencies includes reading the dependencies from a configuration database. In alternative embodiments, the set of dependencies may be generated or updated dynamically, for example by causing dependency analyzer 224 to produce a set of dependencies.

At block 306, the system receives one or more policies associated with power management, heat production, operating cost or workload balancing for the system.

At block, the system receives a workload event. The workload event may be a processing related event such as the startup or shutdown of an application, application component, service or service component. Alternatively the event may be an environment event such as a power usage or temperature level crossing a threshold value that triggers the event.

At block 310, the management console sets the state of one or more processor cores in the system according to the system event received at block 308, the policy received at block 306 and the set of dependencies determined at block 304. For example, the management console (or other component responsible for implementing workload distribution or policies) may communicate with a processor core management API 106 to set the on/off state or processor core speed of a processor core or change the clock speed of a processor core or processor having the processor core.

Typically the state of a processor core will be set in response to an event such as the workload event or environment event described above. Those of skill in the art having the benefit of the disclosure will appreciate that various combinations of policy rules, events and dependencies may be used to achieve power management, heat production or workload management goals. For example, a policy may be directed to reducing energy consumption of the system. As workload components start or end, the management console or other workload manager may analyze all of the processor cores currently in use or available for use across an aggregated system of processor cores across multiple computers to determine which processor cores are to be used. The analysis may use processor or processor core characteristics and application/service dependencies to determine whether or not it is desirable to migrate applications or services completely off of a set of processor cores on an individual processor and shut down the processor cores on the processor, or alternatively, if it is desirable from a power management point of view to split the applications and services across multiple processors and processor cores running at a reduced clock speed. Similarly, a workload event that indicates that temperatures in a particular area of a data center or within a particular rack are increasing passed a desired threshold may cause the system to perform an aggregate analysis of the available processor cores and their characteristics to determine if it is better to migrate applications and services from processor cores running in the area or rack that is overheated to a different area or rack, or whether it is better to throttle back the processor speed for the processor cores such that less heat is generated. In some embodiments, the system uses location data in a configuration database together with data from onboard or external sensors to determine desirable target racks or locations that are to run the migrated applications or services.

The analysis may cause applications and services current running on processor cores that are on separate processors to be migrated to available processor cores such that the total number of processor cores remains the same while reducing the number of processors in use. For example, assume that eight processor cores are required to support a desired level of throughput for an application. Further assume that the application is currently running on two processor cores each of four processors having four cores each and that the other two processor cores of each processor is unused. In response to a workload event, the system may migrate four application components (two from each of two processors) to four of the available processor cores. In this example, two of the processors end up with all four processor cores in use and two of the processors end up with no cores in use. The unused processor cores may be shut down or the processors having the unused cores may be shut down resulting in less heat production or less power usage.

Alternatively, power usage or heat generation characteristics may dictate that it is advantageous to use multiple processor cores across multiple processors running at reduced clock speeds to achieve the same level of throughput that may be achieved using fewer processor cores running at a higher clock speed.

Similarly, the system may avoid shutting down processors having services or applications that satisfy a dependency of another application or service. Further, the system may assign or migrate applications or services that are dependent on one another such that an application or service is running on processor cores that are on the same processor as a processor core hosting the dependent application or service.

Those of skill in the art will appreciate that these are merely a few examples of the many possible scenarios to optimize heat production, power consumption and workload balancing using an aggregated analysis of processor cores in a system coupled with application dependencies and policies.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
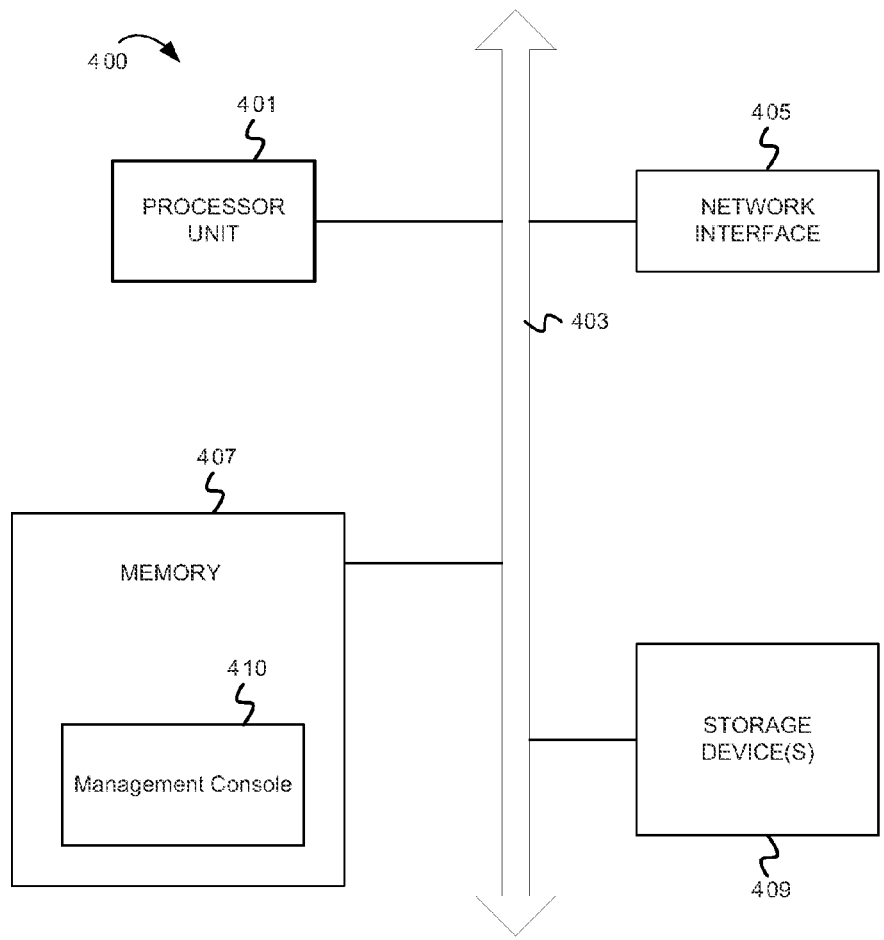
FIG. 4 provides further details of an example computer system.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The system memory 407 embodies functionality to implement embodiments described above. The system memory 407 may include one or more functionalities that facilitate workload management at the processor core level that takes into account policies, dependencies and environmental factors in a system of computers with multi-core processors. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for managing processor cores based in workload dependencies and policies as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
determining a set of processors having multiple processor cores present in a computer system, the processor cores forming an aggregated set of processor cores for the system;
determining a set of dependencies among a set of workload components executing on the set of processors and processor cores, wherein the aggregated set of processor cores are distributed across multiple processors;
receiving a policy, the policy including rules associated with managing one or more of power consumption, heat production, or operating cost for the aggregated set of processor cores;
receiving a workload event; and
in response to the workload event, migrating one or more applications or services from one or more of the processor cores in the aggregated set of processor cores in accordance with the workload event, the policy and the set of dependencies, wherein the one or more applications or services are migrated from a first set of processor cores on a first set of processors to a same number of processor cores on a second set of processors, wherein a number of processors in the second set of processors is less than a number of processors in the first set of processors.

2. The method of claim 1, wherein the workload event comprises a start of an application or service.

3. The method of claim 2, and further comprising assigning the application to a processor core in accordance with the set of dependencies and the policy.

4. The method of claim 1, wherein the workload event comprises a power management event or a heat production event.

5. The method of claim 4, and further comprising migrating one or more applications or services to one or more processor cores in accordance with the set of dependencies and the policy.

6. The method of claim 5, wherein migrating one or more applications or services to one or more processor cores in accordance with the set of dependencies and the policy includes migrating the one or more applications or services to a processor core on the same processor or rack as a dependent application or service.

7. The method of claim 1, and further comprising assigning a virtual machine to a processor core in accordance with the set of dependencies and the policy.

* * * * *